United States Patent [19]
Laing

[11] 4,035,108
[45] July 12, 1977

[54] AXIAL FLOW PUMP FOR A PIVOTAL ROTOR

[76] Inventor: Nikolaus Laing, Hofener Weg 35-37, 7141 Aldingen near Stuttgart, Germany

[21] Appl. No.: 570,828

[22] Filed: Apr. 23, 1975

Related U.S. Application Data

[60] Division of Ser. No. 414,254, Nov. 9, 1973, abandoned, which is a continuation-in-part of Ser. No. 293,102, Sept. 28, 1972, abandoned.

[30] Foreign Application Priority Data

Oct. 7, 1971 Australia .................. 8658

[51] Int. Cl.² .................. F04B 17/00
[52] U.S. Cl. .................. 417/365; 417/420; 417/423 R
[58] Field of Search .......... 417/420, 366, 365, 423, 417/424, 410, 414; 415/106, 210; 310/104, 157, 66

[56] References Cited

U.S. PATENT DOCUMENTS

| | | | |
|---|---|---|---|
| 3,047,753 | 7/1962 | Westell | 415/210 |
| 3,132,595 | 5/1964 | Bower | 417/365 X |
| 3,438,328 | 4/1949 | Laing | 417/420 |
| 3,762,839 | 10/1973 | Laing | 417/420 |
| 3,838,947 | 10/1974 | Laing | 417/420 |
| 3,846,050 | 11/1974 | Laing | 417/420 |
| 3,854,848 | 12/1974 | Laing | 417/424 |

Primary Examiner—William L. Freeh
Assistant Examiner—Edward Look
Attorney, Agent, or Firm—Pennie & Edmonds

[57] ABSTRACT

An axial flow pump having a rotor pivotally supported on a spherical bearing surface where the rotor has axial impeller blades thereon arranged so that in operation of the pump, hydraulic forces will press the rotor onto the bearing surface.

6 Claims, 3 Drawing Figures

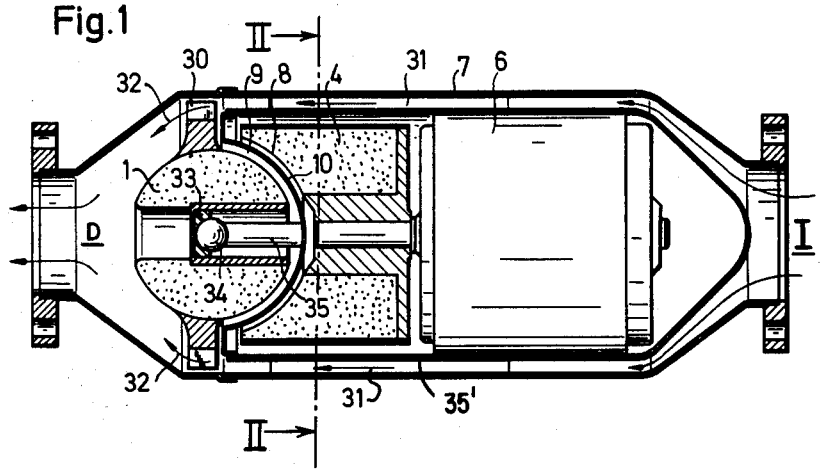
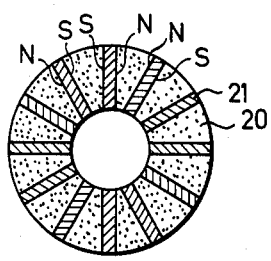

AXIAL FLOW PUMP FOR A PIVOTAL ROTOR

CROSS-REFERENCE TO OTHER APPLICATIONS

This application is a Division of application Ser. No. 414,254, filed Nov. 9, 1973, now abandoned, which is a Continuation-in-Part of my application Ser. No. 293,102 filed Sept. 28, 1972, now abandoned.

THE PRIOR ART

Pumps utilizing magnetic couplings between a driving pole ring and a driven pole ring where the driven pole ring comprises a rotor connected to impeller blading are becoming increasingly important. Such pumps have utilized magnetic gaps between the driven and driving pole rings which extend over spherical surfaces. An advantage of such a construction is that the rotor is then subjected to stabilizing dynamic forces as well as conventional torque forces with the result that a single spherical bearing may be utilized to support the rotor instead of a conventional bearing arrangement. Pumps utilizing magnetic couplings to drive the rotor are referred to as shaftless pumps and have the advantage, as compared with pumps connected to a shaft, that they require no bearing shell and that the rotor can pivot so that any entrained dirt particles may pass around the edges of the impeller blade and not be caught in the pump structure.

Hitherto utilization of pivotal rotors has been only in connection with pumps having radial impellers, or so-called centrifugal flow pumps. The hydraulic impeller thrust in such pumps acts in a direction away from the pump rotor and tends to lift the rotor off its bearing. In large pumps, the impeller force may overcome the axial components of the magnetic forces tending to pull the rotor towards the pump rotor and result in actual lifting of the rotor off the spherical bearing on which it is mounted. In the case of centrifugal flow pumps, the tendency of the rotor to lift off its bearing can be prevented by use of pressure equalization devices with the rotor such that the hydraulic pressure on both sides of the rotor tends to be equalized. Such equalization devices however have not been found suitable for use with axial flow pumps which have a relatively larger axial thrust than centrifugal pumps of the same diameter.

THE OBJECT OF THE INVENTION

The object of the invention is to provide for a pump design which enables the use of the shaftless principle of construction utilizing a magnetic couple in axial flow pumps whereby any tendency of lift off of the pump rotor from a supporting spherical bearing is reduced.

GENERAL DESCRIPTION OF THE INVENTION

Broadly, the invention comprises having an axial flow pump construction incorporating a dynamically stabilized impeller which forms a unit with a first pole ring and which is driven by a second pole ring producing a rotating magnetic field. A spherical gap is provided between the two pole rings and the rotor is supported with respect to the second pole ring by means of a spherical bearing element. The dynamically stabilized impeller is constructed in the form of an axial flow blade ring the blades of which are arranged so that hydraulic flow-through takes place approximately over the impeller blading into a discharge channel which extends axially of the pump. By means of this construction, the increased hydraulic pressure existing in the discharge area of the pump will act on the cross-sectional area of the impeller to urge it towards the spherical bearing on which it is mounted.

DESCRIPTION OF THE DRAWINGS

FIG. 1 is a side sectional view of an axial flow pump constructed according to the invention;

FIG. 2 is a cross-sectional view of FIG. 1 taken along lines II—II; and

DETAILED DESCRIPTION OF THE PREFERRED EMBODIMENTS

Figure 3:
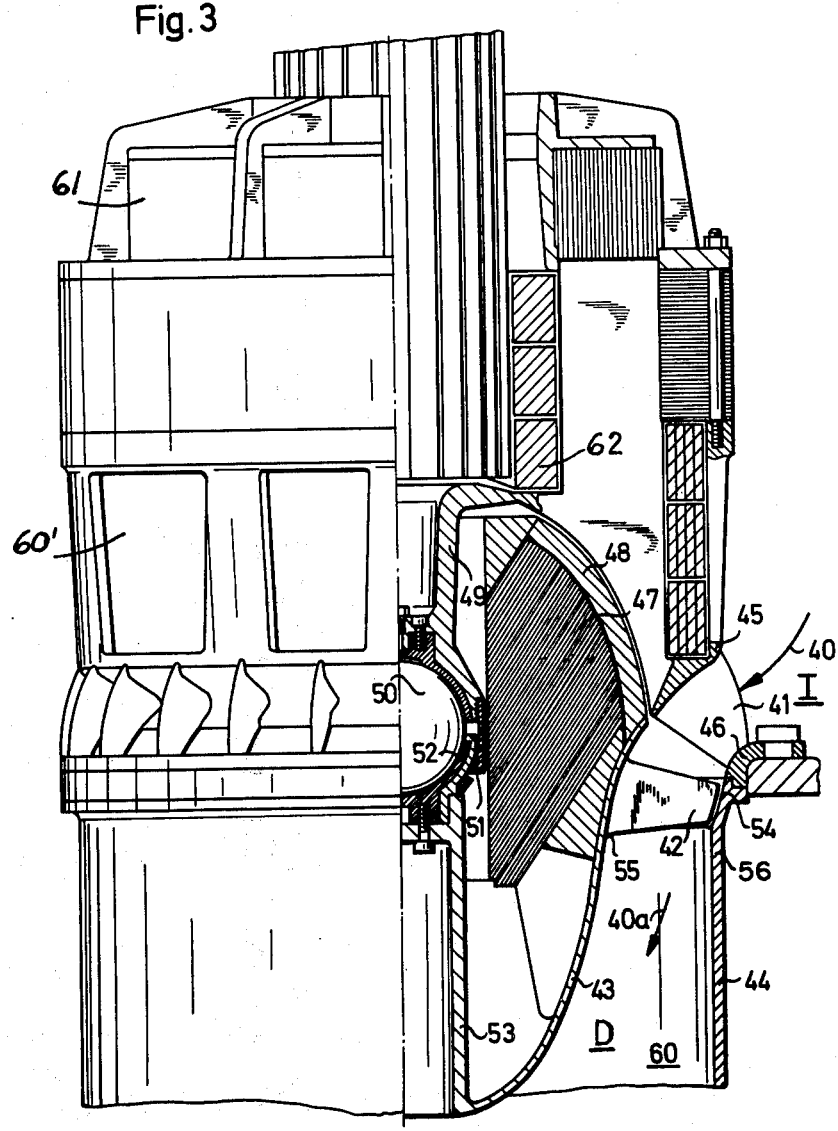
FIG. 3 is an enlarged partial sectional view of a further embodiment of an axial flow pump constructed according to the invention.

Referring to FIG. 1 there is illustrated an axial flow pump having a rotor comprising a first or inner pole ring 1 which has impeller blading 30 thereon. The rotor is mounted on a spherical bearing element 34 which in turn is supported by a stub shaft 35. A concave bearing element 33 is fixed to the rotor 1 and forms a bearing surface with the spherical bearing element 34.

The pump has a motor 6 mounted in the pump casing 7 where the motor drives a second pole ring 4. The pole ring 1 has a pole region 9 which faces the pole region 8 of the pole ring 4 and where both pole regions define a magnetic gap having spherical surfaces. A separating wall 10 of non-magnetic or magnetically-pervious material is included in the gap and serves to sealingly isolate the pole ring 1 from the pole ring 4. Wall 10 joins with an inner housing 35' to form a hermetically sealed chamber enclosing the motor 6 and pole ring 4. The housing 35' also serves, along with the casing 7, to guide flow from an inlet area I of the pump in the direction of the flow line 31 to the blades 30, and then in the direction of the arrow 32 to the discharge area D of the pump. Fluid upstream of the blade 30 may pass between the rotor and the separating wall 10.

The pole ring 1 is free to pivot about the center of the spherical bearing element 34 with the result that any small particles of dirt that may be pulled through the pump may pass by the blading, that is to say, the rotor may be able to pivot to allow dirt to pass between the rotor blading and the casing 7.

As shown in FIG. 2, permanent magnets 20 of the driving pole ring 4 are magnetized circumferentially and enclose therebetween adjacent magnetic soft conductors 21 which extend into the pole region 8. This same construction is also utilized in the make-up of the driven pole ring 1.

This construction of the pole rings is applicable to any magnetic coupling and results in increased flux between the pole rings. By such construction pole ring diameters in order to obtain a given flux may be reduced while maintaining the mass of the magnets constant. This results in a reduction of angular momentum thus reducing changes of a pump motor from burning out during start up operation as the starting torque will be reduced.

When the pump is operating, motor 6 will rotate the driving pole ring 4. The magnetic couple existing between the pole rings will rotate the ring 1 such that the impeller blades thereon will exert a force on the fluid with the result that a flow of fluid through the pump will take place from the inlet area I to the discharge area D. As the hydraulic pressure on the discharge side of the pump will be greater than that between the pump casing and the motor on the up-stream side of the rotor and between the rotor and the wall 10, the result will be that force will be exerted on the rotor 1 to urge the rotor towards the motor 6 and onto the spherical bearing 34.

Referring to FIG. 3, there is illustrated a further form of an axial pump incorporating the invention. In this form of the invention, the motor is not hermetically sealed with respect to the fluid being pumped and, to the contrary, utilizes the fluid being pumped as a means for directly cooling the motor coils. The pump includes guide blades 41 which provide a preswirl on the flow of the fluid as it enters in the direction 40 from an inlet area I. Thereafter the fluid flows through the rotating axial blades 42 to exit in the direction of arrow 40a into the discharge area D.

The rotor comprises a hub 43, which together with the housing wall 44, forms a hub diffuser 60 in which the velocity of the fluid is to a great extent converted into static pressure. The region 54 surrounding the outer edges of the blades 42 lies on a spherical surface, the center of which coincides with the center of the spherical bearing 50. The region 54 merges into a cylindrical region 56 which bounds one side of the diffuser 60. Further the portion of the rotor up-stream of the blades 42 has a greater diameter than the inner diameter of the blades which helps direct flow towards the blades.

The motor housing is supported by a ring 45 which forms a unit with the flange 46 by way of the guide blades 41. The rotor comprises segments 47, the surface of which lie on conical planes and which have apertures on their periphery containing the bars 48 of the cage winding. The rotor is supported with respect to a bearing column 49 of a stator by the spherical bearing 50. A ring 51 extends over the concave bearing dish 52 which is connected to the rotor by way of column 52 and hub 43. The ring 51 prevents the rotor from dropping off of the spherical bearing 50 when the pump is not operating. The rotor is free to pivot with respect to the center of the bearing element 50 so that the changes of any entrained dirt particles becoming wedged between the outer periphery of the blades 42 and the region 54 is minimal.

Fluid is free to circulate through openings 60' and 61 contained in the pump housing and cool the coils 62 of the stator where the coils comprise a stationary pole ring producing a rotating magnetic field. The pressure of this fluid, which is also up-stream of the blades 42, acts on the upper portion of the rotor but its pressure is much less than that existing in the discharge area augmented by the diffuser effect, which results in a net force urging the rotor into engagement with its spherical bearing 50.

I claim:
1. An axial flow pump construction having a fluid inlet area and an axially extending fluid discharge area comprising a dynamically stabilized rotor having a first pole ring thereon, a second pole ring for producing a rotating magnetic field, a spherical gap between the second and first pole rings, a spherical bearing element rotatably and pivotally supporting said rotor whereby said rotor may rotate and pivot about the center of said spherical bearing element, and axial flow impeller blades on said rotor for directing flow of fluid therethrough from said inlet area to said discharge area whereby increased hydraulic pressure in said discharge area when said pump is operating will force said rotor in an axial direction onto said spherical bearing element.

2. An axial flow pump according to claim 1 having in addition a guide blade ring for guiding flow to said impeller blades.

3. An axial flow pump according to claim 1 having in addition an inlet flow deflector up-stream of said impeller blades in the direction of the flow of fluid which deflector includes blades thereon changing radial flow fluid in said inlet area to axial flow.

4. An axial flow pump according to claim 1 having in addition a pump housing with a portion of said housing radially surrounding said impeller blades and lying on a spherical surface the center of which coincides with the center of said spherical bearing element.

5. An axial flow pump according to claim 1 wherein said rotor has a hub region extending into said discharge area wherein the impeller blades have an inner and outer diameter and wherein a portion of the rotor up-stream of the impeller blades in the direction of fluid flow has a greater diameter than the inner diameter of said impeller blades.

6. An axial flow pump according to claim 5 having in addition a fluid diffuser formed in part by said hub portion where said diffuser converts velocity energy of fluid flow when said pump is operating into increased fluid pressure to provide the increased hydraulic pressure in said discharge area.

* * * * *